United States Patent
Niitani et al.

(10) Patent No.: US 9,562,128 B2
(45) Date of Patent: *Feb. 7, 2017

(54) COPOLYMER

(71) Applicant: NIPPON SODA CO., LTD., Tokyo (JP)

(72) Inventors: Takeshi Niitani, Ichihara (JP); Toshiaki Okado, Chiba (JP); Izumi Tando, Ichihara (JP); Hidenori Naruse, Nagoya (JP); Tooru Kajita, Yokkaichi (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,726

(22) PCT Filed: Oct. 15, 2012

(86) PCT No.: PCT/JP2012/006596
§ 371 (c)(1),
(2) Date: Apr. 9, 2014

(87) PCT Pub. No.: WO2013/057918
PCT Pub. Date: Apr. 25, 2013

(65) Prior Publication Data
US 2014/0256884 A1 Sep. 11, 2014

(30) Foreign Application Priority Data

Oct. 20, 2011 (JP) .................... 2011-230390

(51) Int. Cl.
| | |
|---|---|
| *C08F 297/02* | (2006.01) |
| *C08F 299/04* | (2006.01) |
| *C09B 67/04* | (2006.01) |
| *C09B 67/46* | (2006.01) |
| *G02B 5/22* | (2006.01) |
| *C08F 290/06* | (2006.01) |

(52) U.S. Cl.
CPC ......... *C08F 299/04* (2013.01); *C08F 297/026* (2013.01); *C09B 67/0002* (2013.01); *C09B 67/009* (2013.01); *C08F 290/062* (2013.01); *G02B 5/223* (2013.01)

(58) Field of Classification Search
CPC ... C09D 11/326; C08F 265/04; C08F 297/026
See application file for complete search history.

(56) References Cited

U.S. PATENT DOCUMENTS

| | | | |
|---|---|---|---|
| 5,085,698 A * | 2/1992 | Ma ................. | C09D 11/326 524/388 |
| 9,018,311 B2 * | 4/2015 | Niitani et al. ........ | 525/284 |
| 2006/0000391 A1 * | 1/2006 | Hamada ............... | 106/496 |
| 2010/0280182 A1 * | 11/2010 | Balk ................ | C08F 293/005 525/217 |
| 2013/0217832 A1 | 8/2013 | Niitani et al. | |

FOREIGN PATENT DOCUMENTS

| | | |
|---|---|---|
| EP | 0 556 650 A1 | 8/1993 |
| EP | 2 617 746 A1 | 7/2013 |
| JP | A-3-247672 | 11/1991 |
| JP | A-2000-169531 | 6/2000 |
| TW | 201116572 A1 | 5/2011 |
| WO | WO 2008/156148 A1 | 12/2008 |
| WO | 2010/059939 A1 | 5/2010 |
| WO | WO 2012/063435 A1 | 5/2012 |

OTHER PUBLICATIONS

Lowe et al. Macromolecules 1999, 32, 2141-2148.*
Apr. 21, 2015 Extended Supplementary Search Report issued in European Application No. 12 84 1303.6.
International Preliminary Report on Patentability issued in International Application No. PCT/JP2012/006596 mailed May 1, 2014.
International Search Report issued in International Application No. PCT/JP2012/006596 mailed Dec. 18, 2012.

\* cited by examiner

*Primary Examiner* — Mark Kaucher
(74) *Attorney, Agent, or Firm* — Oliff PLC

(57) ABSTRACT

A novel copolymer having excellent pigment dispersion performance, and more particularly, a novel copolymer usable as a pigment dispersing agent that can attain high luminance and high contrast of a green picture element in a color filter. The novel copolymer contains: a block chain (A) including a repeating unit having a tertiary amino group; and a block chain (B) including a repeating unit represented by the following formula (I) (wherein $R^1$ represents a hydrogen atom or a C1-C3 alkyl group, $R^2$ and $R^3$ each independently represent a hydrogen atom or a C1-C6 alkyl group, Q represents an oxygen-containing saturated hetero ring group optionally having an alkyl group as a substituent or a C2-C20 alkenyl group, and n represents an integer of 0 to 6), and has an amine value of 80 mgKOH/g or more and 250 mgKOH/g or less.

4 Claims, No Drawings

COPOLYMER

TECHNICAL FIELD

The present invention relates to a novel copolymer useful as a dispersing agent, and more particularly, it relates to a block copolymer having a tertiary amino group.

The present application claims the benefit of priority from Japanese Patent Application No. 2011-230390, filed on Oct. 20, 2011, the contents of which are incorporated herein by reference.

BACKGROUND ART

Copolymer-type pigment dispersing agents have been developed in a variety of fields. In the field of, for example, color liquid crystal displays, a copolymer-type pigment dispersing agent is used in producing a color filter by a pigment dispersion method. A color filter is required to show performances of high contrast, high luminance, and the like. A pigment that has a peculiar transmission absorption spectrum in the visible light wavelength region according with the fluorescence emission spectrum of a backlight is suitably used. In order to increase the contrast, it is significant to minimize the light scattering in a color filter layer, and hence, a pigment made finer to have a primary particle size of several tens nm or less is used.

In order to attain high luminance of a green picture element, a combination of a green pigment and various yellow pigments has been conventionally employed. A pigment in the form of finer particles is, however, easily aggregated again, and in addition, a pigment obtained as the combination of a green pigment and various yellow pigments is liable to be unstable in a dispersion system, and thus, there was no suitable dispersing agent.

Patent Document 1 proposes a dispersing agent to be used in the case where a brominated zinc phthalocyanine green pigment is used for purpose of increasing the luminance of a green picture element. This document proposes a dispersing agent that is a copolymer of a block A having affinity for a solvent and a block B having a functional group comprising a nitrogen atom, and has an amine value, in terms of effective solid content, of 80 mgKOH/g or more and 150 mgKOH/g or less.

A color filter described in this document is, however, insufficient in heat resistance and the like of a green picture element.

PRIOR ART DOCUMENTS

Patent Documents

Patent Document 1: WO 2008/156148

SUMMARY OF THE INVENTION

Object to be Solved by the Invention

An object of the present invention is to provide a novel copolymer having excellent pigment dispersion performance, and more particularly, to provide a novel copolymer usable as a pigment dispersing agent that can improve heat resistance of a green picture element in a color filter.

Means to Solve the Object

The present inventors have earnestly studied for overcoming the aforementioned problems, resulting in finding that the problems may be overcome by using a block copolymer comprising a block chain comprising a repeating unit having a tertiary amino group; and a block chain comprising a repeating unit represented by formula (I), wherein the copolymer has an amine value of 80 mgKOH/g or more and 250 mgKOH/g or less, and thus, the present invention has been achieved.

Specifically, the present invention relates to:

(1) a copolymer comprising a block chain (A) comprising a repeating unit having a tertiary amino group, and a block chain (B) comprising a repeating unit represented by formula (I):

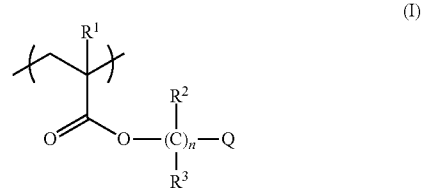

(wherein $R^1$ represents a hydrogen atom or a C1-C3 alkyl group, $R^2$ and $R^3$ each independently represent a hydrogen atom or a C1-C6 alkyl group, Q represents an oxygen-containing saturated hetero ring group optionally having an alkyl group as a substituent or a C2-C20 alkenyl group, and n represents an integer of 0 to 6), wherein the copolymer has an amine value of 80 mgKOH/g or more and 250 mgKOH/g or less;

(2) the copolymer according to (1), wherein the repeating unit having a tertiary amino group is a repeating unit represented by formula (II):

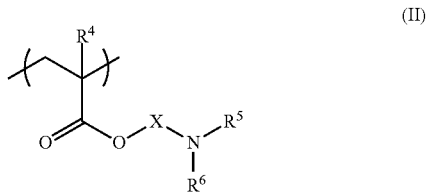

(wherein $R^4$ represents a hydrogen atom or a C1-C3 alkyl group, $R^5$ and $R^6$ each independently represent a C1-C6 alkyl group or a C6-C10 aryl C1-C6 alkyl group, and X represents a C1-C10 alkylene group or a C1-C10 alkylene-O—C1-C10 alkylene group.);

(3) the copolymer according to (1) or (2), wherein the copolymer has a ratio (Mw/Mn) between a weight average molecular weight (Mw) and a number average molecular weight (Mn) of 1.01 to 2.00; and (4) the copolymer according to any one of (1) to (3), wherein the copolymer has a weight average molecular weight (Mw) of 2,000 to 50,000.

MODE OF CARRYING OUT THE INVENTION (1) Copolymer

A copolymer of the present invention comprises at least one block chain (A) and at least one block chain (B) described below.

Block chain (A): a block chain comprising a repeating unit having a tertiary amino group.

Block chain (B): a block chain comprising a repeating unit represented by formula (I).

Furthermore, the copolymer of the present invention may contain another block chain in addition to the block chain (A) and the block chain (B).

1) Block Chain (A)

In the block chain (A), the repeating unit having a tertiary amino group is not particularly limited as far as it has the tertiary amino group on a side chain thereof.

Specifically, the block chain (A) includes those obtained by polymerization of one or more of repeating units having a tertiary amino group and those obtained by copolymerization of such chains and a repeating unit derived from another copolymerizable monomer. The copolymerization includes random copolymerization, alternating copolymerization, block copolymerization and the like.

(Repeating Unit Having Tertiary Amino Group)

The repeating unit having a tertiary amino group is not particularly limited as far as it has a tertiary amino group, and an example is a repeating unit represented by the following general formula (II):

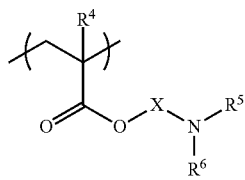

(II)

In formula (II), $R^4$ represents a hydrogen atom or a C1-C3 alkyl group, $R^5$ and $R^6$ each independently represent a C1-C6 alkyl group or a C6-C10 aryl C1-C6 alkyl group, and X represents a C1-C10 alkylene group or a C1-C10 alkylene-O—C1-C10 alkylene group.

Here, examples of the C1-C3 alkyl group or the C1-C6 alkyl group include methyl, ethyl, n-propyl, i-propyl, n-butyl, s-butyl, i-butyl, t-butyl, n-pentyl and n-hexyl.

Examples of the C1-C10 alkylene group include a methylene chain, an ethylene chain, a propylene chain, a methyl ethylene chain, a butylene chain, a 1,2-dimethylethylene chain, a pentylene chain, a 1-methylbutylene chain, a 2-methylbutylene chain or a hexylene chain.

Examples of the C6-C10 aryl C1-C6 alkyl group include benzyl, phenethyl, 3-phenyl-n-propyl, 1-phenyl-n-hexyl, naphthalen-1-ylmethyl, naphthalen-2-ylethyl, 1-naphthalen-2-yl-n-propyl and inden-1-ylmethyl.

Examples of a monomer usable as a material for the repeating unit represented by formula (II) include dimethylaminoethyl (meth)acrylate, dimethylaminopropyl (meth)acrylate, dimethylaminobutyl (meth)acrylate, diethylaminoethyl (meth)acrylate, diethylaminopropyl (meth)acrylate, diethylaminobutyl (meth)acrylate, dimethylaminoethoxyethyl (meth)acrylate, dimethylaminoethoxypropyl (meth)acrylate and diethylaminobutoxybutyl (meth)acrylate.

(Another Repeating Units that can be Contained)

Examples of another repeating unit that can be contained in the block chain (A) include repeating units derived from a (meth)acrylic acid-based monomer, an aromatic vinyl-based monomer, a conjugated diene-based monomer.

Examples of the (meth)acrylic acid-based monomer, the aromatic vinyl-based monomer or the conjugated diene-based monomer usable as a material for the repeating unit are as follows.

Examples of the (meth)acrylic acid-based monomer include (meth)acrylic acid; (meth)acrylic acid ester compounds such as methyl (meth)acrylate, ethyl (meth)acrylate, n-propyl (meth)acrylate, i-propyl (meth)acrylate, n-butyl (meth)acrylate, i-butyl (meth)acrylate, s-butyl (meth)acrylate, t-butyl (meth)acrylate, hexyl (meth)acrylate, glycidyl (meth)acrylate, cyclohexyl (meth)acrylate, 2-ethylhexyl (meth)acrylate, 1-ethylcyclohexyl (meth)acrylate and benzyl (meth)acrylate; 2-methoxyethyl (meth)acrylate, methoxypolyethylene glycol (in which the number of ethylene glycol units is 2 to 100) (meth)acrylate, ethoxypolyethylene glycol (meth)acrylate, and phenoxypolyethylene glycol (meth)acrylate, and these monomers may be singly used or a mixture of two or more of them may be used.

Examples of the aromatic vinyl-based monomer include styrene; styrene derivatives such as o-methylstyrene, p-methylstyrene, p-t-butylstyrene, α-methylstyrene, p-t-butoxystyrene, m-t-butoxystyrene, p-(1-ethoxyethoxy)styrene, 2,4-dimethylstyrene, vinylaniline and vinylbenzoic acid; heteroaryl compounds such as 2-vinylpyridine, 4-vinylpyridine, 2-vinylquinoline, 4-vinylquinoline, 2-vinylthiophene, and 4-vinylthiophene; vinylnaphthalene, vinylanthracene; and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

2) Block Chain (B)

The block chain (B) includes those obtained by polymerization of one or more of repeating units represented by formula (I) and those obtained by copolymerization of such chains and a repeating unit derived from another copolymerizable monomer. The copolymerization includes random copolymerization, alternating copolymerization, block copolymerization and the like.

(Repeating Unit Represented by Formula (I))

The block chain (B) contains at least one repeating unit represented by formula (I):

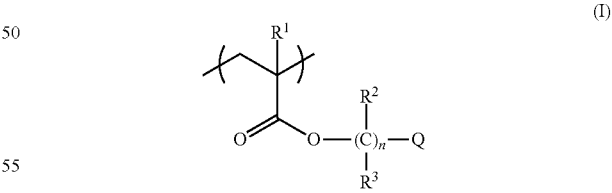

(I)

In formula (I), $R^1$ represents a hydrogen atom or a C1-C3 alkyl group, $R^2$ and $R^3$ each independently represent a hydrogen atom or a C1-C6 alkyl group, Q represents an oxygen-containing saturated hetero ring group optionally having a substituent or a C2-C20 alkenyl group, and n represents any integer of 0 to 6.

In the present invention, examples of the C1-C3 alkyl group of $R^1$ and the C1-C6 alkyl group are the same as those described above with respect to formula (II) representing the repeating unit having a tertiary amino group.

In the present invention, the oxygen-containing saturated hetero ring group of Q optionally has a substituent at an arbitrary carbon atom of the ring. An oxygen-containing saturated hetero ring group means a 3- to 8-membered saturated hetero ring comprising at least one oxygen atom and further optionally comprising one hetero atom chosen from N, S and O, and is preferably a 3- to 6-membered saturated hetero ring.

Here, examples of the oxygen-containing saturated hetero ring group include an oxiranyl group, an oxetanyl group, a tetrahydrofuranyl group, a tetrahydropyranyl group, a morpholinyl group and a thiomorpholinyl group. Among these, cross-linkable functional groups such as an oxiranyl group, an oxetanyl group, a tetrahydrofuranyl group and a tetrahydropyranyl group are preferred.

The substituent of the oxygen-containing saturated hetero ring group is a C1-C6 alkyl group. Examples of the C1-C6 alkyl group are the same as those described above with respect to formula (II) representing the repeating unit having a tertiary amino group.

Examples of the C2-C20 alkenyl group of Q include a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, a 5-hexenyl group, a heptenyl group, an octenyl group, a decenyl group, a pentadecenyl group, an eicosenyl group and a tricosenyl group. Among these, C2-C6 alkenyl groups are preferred.

Examples of a monomer usable as a material for the repeating unit represented by formula (I) include oxetane-2-ylmethyl (meth)acrylate, oxetane-3-ylmethyl (meth)acrylate, (2-methyloxetane-2-yl)methyl (meth)acrylate, (3-methyloxetane-3-yl)methyl (meth)acrylate, (2-ethyloxetane-2-yl)methyl (meth)acrylate, (3-ethyloxetane-3-yl)methyl (meth)acrylate, (3-propyloxetane-3-yl)methyl (meth)acrylate, 2-(oxetane-2-yl)ethyl (meth)acrylate, 2-(oxetane-3-yl)ethyl (meth)acrylate, (tetrahydrofuran-2-yl)methyl (meth)acrylate, (tetrahydrofuran-3-yl)methyl (meth)acrylate, (2-methyltetrahydrofuran-2-yl)methyl (meth)acrylate, (3-methyltetrahydrofuran-3-yl)methyl (meth)acrylate, (5-methyltetrahydrofuran-2-yl)methyl (meth)acrylate, (4-methyltetrahydrofuran-2-yl)methyl (meth)acrylate, (3-methyltetrahydrofuran-2-yl)methyl (meth)acrylate, (2-methyltetrahydrofuran-3-yl)methyl (meth)acrylate, (5-methyltetrahydrofuran-3-yl)methyl (meth)acrylate, (4-methyltetrahydrofuran-3-yl)methyl (meth)acrylate, 2-(tetrahydrofuran-3-yl)ethyl (meth)acrylate, oxiran-2-ylmethyl (meth)acrylate, (3-methyloxiran-2-yl)methyl (meth)acrylate, (2-methyloxiran-2-yl)methyl (meth)acrylate, allyl (meth)acrylate, 2-methylallyl (meth)acrylate, (meth)acrylic acid, (meth)acrylic acid (E)-butene-2-yl, (meth)acrylic acid (Z)-butene-2-yl, 3-butenyl (meth)acrylate, 3-methyl-3-butenyl (meth)acrylate, (meth)acrylic acid (E)-pentene-3-yl, (meth)acrylic acid (Z)-pentene-3-yl and 3-methyl-2-butenyl (meth)acrylate.

(Another Repeating Unit that can be Contained)

Examples of another repeating unit that can be contained in the block chain (B) include repeating units derived from a (meth)acrylic acid-based monomer, an aromatic vinyl-based monomer, a conjugated diene-based monomer and the like.

Examples of the (meth)acrylic acid-based monomer, the aromatic vinyl-based monomer and the conjugated diene-based monomer usable as a material for the repeating unit are as follows.

Examples of the (meth)acrylic monomer include (meth)acrylic acid; (meth)acrylic acid ester compounds such as methyl (meth)acrylate, ethyl (meth)acrylate, n-propyl (meth)acrylate, i-propyl (meth)acrylate, n-butyl (meth)acrylate, i-butyl (meth)acrylate, s-butyl (meth)acrylate, t-butyl (meth)acrylate, hexyl (meth)acrylate, glycidyl (meth)acrylate, cyclohexyl (meth)acrylate, 2-ethylhexyl (meth)acrylate, 1-ethylcyclohexyl (meth)acrylate and benzyl (meth)acrylate; 2-methoxyethyl (meth)acrylate, methoxypolyethylene glycol (in which the number of ethylene glycol units is 2 to 100) (meth)acrylate, ethoxypolyethylene glycol (meth)acrylate, and phenoxypolyethylene glycol (meth)acrylate, and these monomers may be singly used, or a mixture of two or more of them may be used.

Examples of the aromatic vinyl-based monomer include styrene; styrene derivatives such as o-methyl styrene, p-methyl styrene, p-t-butyl styrene, α-methyl styrene, p-t-butoxystyrene, m-t-butoxystyrene, p-(1-ethoxyethoxy)styrene, 2,4-dimethylstyrene, vinylaniline and vinylbenzoic acid; heteroaryl compounds such as 2-vinylpyridine, 4-vinylpyridine, 2-vinylquinoline, 4-vinylquinoline, 2-vinylthiophene, and 4-vinylthiophene; vinylnaphthalene, vinylanthracene; and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

3) Other Items (Block Chain that can be Contained in Copolymer in Addition to Block Chains (A) and (B))

The copolymer of the present invention may contain another block chain in addition to the block chains (A) and (B).

Examples of the another block chain include a block chain containing a repeating unit derived from a (meth)acrylic monomer, an aromatic vinyl monomer, a conjugated diene monomer. Examples of such a block chain include a block chain obtained by homopolymerization, a block chain obtained by random copolymerization and a block chain obtained by alternating copolymerization.

Examples of the (meth)acrylic acid-based monomer, the aromatic vinyl-based monomer and the conjugated diene-based monomer are the same as those described above.

(Ratio Between Block Chains (A) and (B) in Copolymer and their Physical Properties Such as Amine Value and Molecular Weights)

A ratio between the block chain (A) and the block chain (B) in the copolymer of the present invention is not particularly limited, and is 20 to 80:80 to 20 and preferably 40 to 60:60 to 40 in a wt % ratio. Besides, the amine value of the copolymer is 80 mgKOH/g or more and 250 mgKOH/g or less, preferably 120 mgKOH/g or more and 250 mgKOH/g or less, and more preferably 140 mgKOH/g or more and 200 mgKOH/g or less.

The amine value may be measured by an automatic potentiometric titrator (AT-510 manufactured by Kyoto Electronics Manufacturing Co., Ltd.).

Also, a weight average molecular weight measured by GPC is 1,000 to 200,000. As a dispersing agent it is preferably 2,000 to 50,000 and more preferably 5,000 to 30,000. A ratio between a weight average molecular weight and a number average molecular weight measured by GPC is 1.0 to 2.5, and preferably 1.0 to 2.0 particularly as a dispersing agent.

(2) Method for Producing Copolymer

A method for producing the block copolymer of the present invention is not particularly limited, and it may be produced by a known method, for example, by polymerizing monomers through living polymerization for obtaining a block copolymer. The living polymerization may be living radical polymerization or living anionic polymerization, between which the living anionic polymerization is preferred.

For obtaining the block copolymer, monomers of the block chain (A) or (B) may be polymerized and the resultant may be successively polymerized with monomers of the other block into a block copolymer, or alternatively, monomers of the block chain (A) and the block chain (B) may be individually reacted to prepare blocks and the blocks may be combined thereafter. The living anionic polymerization is preferably employed because a composition and a molecular weight may be strictly controlled in this method.

In producing a block copolymer by the living anionic polymerization, the polymerization may be performed, for example, by adding a desired monomer dropwise to a solvent including an additive and a polymerization initiator. Here, in order to obtain a block polymer with a desired sequence, a reaction is caused by successively adding monomers of the respective blocks dropwise so as to attain a desired sequence.

In order to polymerize monomers of a given block and subsequently polymerize monomers of a next block, after completing the polymerization reaction of the former block, the monomers of the next block are started to add dropwise. Progress of a polymerization reaction may be checked by detecting a remaining amount of the monomers through gas chromatography or liquid chromatography. Furthermore, after completing the dropwise addition of the monomers of the former block, the resultant may be stirred for 1 minute to 1 hour, depending upon the types of monomers and solvent, before starting the dropwise addition of the monomers of the next block.

When a plurality of kinds of monomers are included in each block, these monomers may be individually or simultaneously added dropwise.

In the case where the living radical polymerization is employed for producing the copolymer, the reaction may be carried out in the same manner as in employing the living anionic polymerization, or after polymerizing monomers of a given block, the resultant polymer is purified once before polymerizing a next monomer, so that the next monomer may be polymerized after removing a residue of the monomer remaining after the former reaction. In the case where it is preferred that the monomers of the respective blocks are not mixed with each other, the polymer is preferably purified.

An anionic polymerization initiator used in the polymerization of monomers is not particularly limited as far as it is a nucleophilic agent having a function to start polymerization of an anionic polymerizable monomer, and for example, an alkali metal or an organic alkali metal compound may be used.

Examples of the alkali metal include lithium, sodium, potassium and cesium. Examples of the organic alkali metal compound include alkylated substances, allylated substances and arylated substances of the aforementioned alkali metals and lithium amide compound. Specifically, ethyllithium, n-butyllithium, sec-butyllithium, t-butyllithium, ethylsodium, lithiumbiphenyl, lithiumnaphthalene, lithiumtriphenyl, sodiumnaphthalene, potassiumnaphthalene, methyl 2-lithioisobutyrate, ethyl 2-lithioisobutyrate, isopropyl 2-lithioisobutyrate, α-methylstyrenesodium dianion, 1,1-diphenylhexyllithium, 1,1-diphenyl-3-methylpentyllithium, 1,4-dilithio-2-butene, 1,6-dilithiohexane, polystyryllithium, cumylpotassium, cumylcesium, lithium dimethylamide, lithium diethylamide, lithium dibutylamide, lithium dipropylamide, lithium diisopropylamide, lithium diheptylamide, lithium dihexylamide, lithium dioctylamide may be used. These anionic polymerization initiators may be singly used or a mixture of two or more of them may be used.

A usage of the anionic polymerization initiator is generally 0.0001 to 0.2 equivalent and preferably 0.0005 to 0.1 equivalent based on the entire amount of anionic polymerizable monomers to be used. When an anionic polymerization initiator is used in an amount of this range, a desired polymer may be produced in high yield.

A polymerization temperature employed in the present invention is not particularly limited as far as it falls within a temperature range where a side reaction of a transfer reaction or a termination reaction may be avoided and monomers may be consumed to complete the polymerization, and the polymerization is preferably carried out in a temperature range of −100° C. or higher and a boiling point of a solvent or lower. Furthermore, a concentration of monomers in a polymerization solvent is not particularly limited, and is generally 1 to 40 wt % and preferably 2 to 15 wt %.

The polymerization solvent used in the production method of the present invention is not particularly limited as far as it is not involved in the polymerization reaction and is compatible with polymers, and specific examples include polar solvents of ether-based compounds such as diethyl ether, tetrahydrofuran (THF), dioxane and trioxane, and tertiary amines such as tetramethylethylene diamine and hexamethylphosphoric triamide; and non-polar solvents or low-polar solvents of aliphatic, aromatics or alicyclic hydrocarbon compounds such as hexane and toluene. These solvents may be singly used or a mixture of two or more of them may be used as a mixed solvent. In the production method of the present invention, even when a non-polar solvent or a low-polar solvent is used together with a polar solvent, the polymerization may be accurately controlled, and for example, a non-polar solvent or a low-polar solvent may be used in a ratio of 5 vol % or more, 20 vol % or more, or 50 vol % or more based on the entire amount of the solvent.

In the present invention, organic metals, for example, dialkyl zinc such as diethyl zinc, dialkyl magnesium such as dibutyl magnesium, or triethyl aluminum, may be used as a polymerization stabilizer or a purifying agent for a monomer or a solvent if necessary.

In the present invention, an additive such as an alkali metal salt or an alkaline earth metal salt may be added at the start of or during the polymerization if necessary. Examples of such an additive include mineral acid salts or halides such as sulfates, nitrates, and borates of sodium, potassium, barium and magnesium, and more specifically, examples are chlorides, bromides and iodides of lithium or barium, lithium borate, magnesium nitrate, sodium chloride and potassium chloride. Among these additives, halides of lithium such as lithium chloride, lithium bromide, lithium iodide and lithium fluoride are preferred, and lithium chloride is particularly preferred.

(3) Use of Copolymer of the Invention

The copolymer of the present invention is useful not only for dispersing various organic pigments in coating, printing ink, inkjet ink, a pigment dispersion used for a color filter and the like but also for dispersing inorganic particles of metal oxide, metal hydroxide, metal carbonate, metal sulfate, metal silicate, metal nitride and the like, and dispersing carbon nanotube. In particular, it is extremely useful for dispersing a pigment in a pigment dispersion used for a color filter.

EXAMPLES

The present invention will now be described in detail by way of Examples, which do not limit the technical scope of the invention.

Example 1

A 1000-mL flask was charged with 470.2 g of tetrahydrofuran (hereinafter sometimes abbreviated as THF) and 91.5 g of lithium chloride (a THF solution with a concentration of 2.6 wt %), and the resultant was cooled to −60° C. 12.2 g of n-butyllithium (a hexane solution with a concentration of 15.4 wt %) was added thereto, the resultant was stirred for 5 minutes, and then, diphenylethylene (4.9 g) was added thereto, followed by stirring for 15 minutes. A mixed solution of 67.3 g of methyl methacrylate (hereinafter sometimes abbreviated as MMA) and 28.3 g of tetrahydrofurfuryl methacrylate (hereinafter sometimes abbreviated as THFMA) was added dropwise thereto, and the reaction was continued for 15 minutes. Then, the resultant was subjected to gas chromatography (hereinafter abbreviated as GC), and thus disappearance of the monomers was confirmed. Next, 47.3 g of 2-(dimethylamino)ethyl methacrylate (hereinafter sometimes abbreviated as DMMA) was added dropwise thereto, and the reaction was continued for 30 minutes after the dropwise addition. Then, after confirming disappearance of the monomers by the GC, 4.8 g of methanol was added thereto to terminate the reaction. The thus obtained copolymer was analyzed by gel permeation chromatography (hereinafter abbreviated as GPC) (mobile phase: DMF, PMMA standard), and it was confirmed to be a copolymer having a molecular weight (Mw) of 9670, a molecular weight distribution (Mw/Mn) of 1.14 and a composition ratio of DMMA-[MMA/THFMA]=33-[47/20] wt %. Besides, the copolymer had an amine value of 130 mgKOH/g.

Example 2

A 2000-mL flask was charged with 935.7 g of THF and 23.8 g of lithium chloride (a THF solution with a concentration of 3.9 wt %), and the resultant was cooled to −60° C. 19.2 g of n-butyllithium (a hexane solution with a concentration of 15.4 wt %) was added thereto, the resultant was stirred for 10 minutes, and then, diisopropylamine (4.5 g) was added thereto, followed by stirring for 15 minutes. Subsequently, methyl isobutyrate (4.5 g) was added thereto, followed by stirring for another 15 minutes. A mixed solution of 57.3 g of MMA, 42.8 g of methoxy polyethylene glycol monomethacrylate (PME-200 manufactured by NOF Corporation) and 37.7 g of THFMA was added dropwise thereto, and the reaction was continued for 15 minutes. After confirming disappearance of the monomers by the GC, 112.3 g of DMMA was added dropwise thereto, and the reaction was continued for 30 minutes after the dropwise addition. After confirming disappearance of the monomers by the GC, 6.9 g of methanol was added thereto to terminate the reaction. The thus obtained copolymer was prepared into a propylene glycol monomethyl ether acetate (hereinafter abbreviated as PGMEA) solution with a concentration of 40 wt %. The thus obtained copolymer was analyzed by the GPC (mobile phase: DMF, PMMA standard), and it was confirmed to be a copolymer having a molecular weight (Mw) of 10100, a molecular weight distribution (Mw/Mn) of 1.22 and a composition ratio of DMMA-[MMA/PME-200/THFMA]=45-[23/17/15] wt %. Besides, the copolymer had an amine value of 158 mgKOH/g.

Example 3

A 2000-mL flask was charged with 991.1 g of THF and 1.7 g of lithium chloride, and the resultant was cooled to −60° C. 19.0 g of n-butyllithium (a hexane solution with a concentration of 15.4 wt %) was added thereto, the resultant was stirred for 10 minutes, and then, 4.2 g of diisopropylamine was added thereto, followed by stirring for 15 minutes. Subsequently, 4.1 g of methyl isobutyrate was added thereto, followed by stirring for another 15 minutes. A mixed solution of 71.1 g of n-butyl methacrylate (hereinafter abbreviated as nBMA), 48.3 g of methoxy polyethylene glycol monomethacrylate (PME-200 manufactured by NOF Corporation), 22.8 g of THFMA and 31.4 g of 2-ethoxyethyl methacrylate (hereinafter abbreviated as EEMA) was added dropwise thereto, and the reaction was continued for 15 minutes. After confirming disappearance of the monomers by the GC, 126.5 g of DMMA was added dropwise thereto, and the reaction was continued for 30 minutes after the dropwise addition. After confirming disappearance of the monomers by the GC, 6.1 g of methanol was added thereto to terminate the reaction.

After the thus obtained precursor polymer was prepared into a PGMEA solution with a concentration of 30 wt %, 130 g of water was added thereto, the resultant was heated to 100° C. and the reaction was conducted for 7 hours. The resultant was prepared into a PGMEA solution with a concentration of 40 wt % by distilling off a water content.

The thus obtained copolymer was analyzed by the GPC (mobile phase: DMF, PMMA standard), and it was confirmed to be a copolymer having a molecular weight (Mw) of 10640, a molecular weight distribution (Mw/Mn) of 1.27 and a composition ratio of DMMA-[nBMA/PME200/THFMA/MA]=44-[25/17/8/6] wt % (wherein MA represents methacrylic acid). Besides, the copolymer had an amine value of 149 mgKOH/g.

Comparative Example 1

A 1000-mL flask was charged with 524.3 g of THF and 49.6 g of lithium chloride (a THF solution with a concentration of 4.1 wt %), and the resultant was cooled to −60° C. 10.8 g of n-butyllithium (a hexane solution with a concentration of 15.4 wt %) was added thereto, the resultant was stirred for 10 minutes, and then, diisopropylamine (2.3 g) was added thereto, followed by stirring for 15 minutes.

Subsequently, methyl isobutyrate (2.4 g) was added thereto, followed by stirring for another 15 minutes. A mixed solution of 52.8 g of MMA and 22.4 g of PME-200 (manufactured by NOF Corporation) was added dropwise thereto, and the reaction was continued for minutes. After confirming disappearance of the monomers by the GC, 36.9 g of DMMA was added dropwise thereto, and the reaction was continued for 30 minutes after the dropwise addition. After confirming disappearance of the monomers by the GC, 3.8 g of methanol was added thereto to terminate the reaction. The thus obtained copolymer was analyzed by the GPC (mobile phase: DMF, PMMA standard), and it was confirmed to be a copolymer having a molecular weight (Mw) of 9300, a molecular weight distribution (Mw/Mn) of 1.19 and a composition ratio of DMMA-[MMA/PME-200]=33-[47/20] wt %. Besides, the copolymer had an amine value of 113 mgKOH/g.

Comparative Example 2

A 1000-mL flask was charged with 472.2 g of THF and 90.2 g of lithium chloride (a THF solution with a concentration of 2.6 wt %), and the resultant was cooled to −60° C. 12.2 g of n-butyllithium (a hexane solution with a concentration of 15.4 wt %) was added thereto, the resultant was stirred for 5 minutes, and then, diphenylethylene (4.8 g) was added thereto, followed by stirring for 15 minutes. A mixed solution of 47.8 g of MMA, 24.7 g of PME-200 (manufactured by NOF Corporation) and 25.0 g of THFMA was added dropwise thereto, and the reaction was continued for 15 minutes. After confirming disappearance of the monomers by the GC, 27.3 g of DMMA was added dropwise thereto, and the reaction was continued for 30 minutes after the dropwise addition. After confirming disappearance of the monomers by the GC, 4.6 g of methanol was added thereto to terminate the reaction. The thus obtained copolymer was prepared into a PGMEA solution with a concentration of 40 wt %. The thus obtained copolymer was analyzed by the GPC (mobile phase: DMF, PMMA standard), and it was confirmed to be a copolymer having a molecular weight (Mw) of 11280, a molecular weight distribution (Mw/Mn) of 1.16 and a composition ratio of DMMA-[MMA/PME-200/THFMA]=22-[38/20/20] wt %. Besides, the copolymer had an amine value of 74 mgKOH/g.

(Preparation and Evaluation of Pigment Dispersion Solutions)

Each of the solutions of the copolymers obtained in Examples 1 to 3 and Comparative Examples 1 and 2 described above was prepared into a PGMEA solution with a solid content concentration of 40 wt %, and each of the thus prepared solutions was used as a pigment dispersing agent for preparing a pigment dispersion solution as follows.

A pigment dispersion solution was prepared by mixing and dispersing, for 12 hours with a bead mill, 12 parts by weight of C. I. Pigment Green 58 and 3 parts by weight of C. I. Pigment Yellow 138 used as pigments, 10 parts by weight of the solution of any one of the copolymers obtained in Examples 1 to 3 and Comparative Examples 1 and 2 used as the pigment dispersing agent, and 75 parts by weight of PGMEA used as a solvent. As a result, the pigment dispersion solutions prepared by using the solutions of the copolymers obtained in Examples 1 to 3 and Comparative Example 1 showed a color of brilliant green, and even after they were kept at 40° C. for 1 week, they exhibited viscosity values equivalent to those attained immediately after the preparation. However, the pigment dispersion solutions prepared by using the solutions of the copolymers obtained in Example 1 and Comparative Example 1 had initial viscosity higher by approximately 30% and rather poorer thixotropic properties as compared with the pigment dispersion solutions prepared by using the solutions of the copolymers obtained in Examples 2 and 3. On the other hand, although the pigment dispersion solution prepared by using the copolymer obtained in Comparative Example 2 showed a color of brilliant green, it had initial viscosity higher by approximately 100% and poorer thixotropic properties as compared with the pigment dispersion solutions prepared by using the solutions of the copolymers obtained in Examples and 3. The pigment dispersion solution prepared by using the copolymer obtained in Comparative Example 2 exhibited, after it was kept at 40° C. for 1 week, a viscosity value larger by 50% than that attained immediately after the preparation.

Furthermore, each of the thus obtained pigment dispersion solutions was diluted with a 40 wt % methyl polymethacrylate solution, and the resulting solution was applied on a glass substrate and heated at 230° C. for 1 hour, so as to form a green coating film. The thus formed coating films were observed with an optical microscope, and no foreign matters were found on the coating films formed from the pigment dispersion solutions prepared by using the copolymers obtained in Examples 1 to 3 and Comparative Example 2. On the other hand, foreign matters with a size of several to several tens μm were found on the coating film formed from the pigment dispersion solution prepared by using the copolymer obtained in Comparative Example 1.

INDUSTRIAL APPLICABILITY

The novel copolymer of the present invention has excellent pigment dispersion performance, and in addition, can improve the heat resistance of a green picture element in a color filter.

The invention claimed is:
1. A copolymer comprising:
   a block chain (A) comprising a repeating unit having a tertiary amino group; and
   a block chain (B) comprising:
      a repeating unit derived from methoxypolyethylene glycol (meth)acrylate or ethoxypolyethylene glycol (meth)acrylate; and
      a repeating unit represented by formula (I):

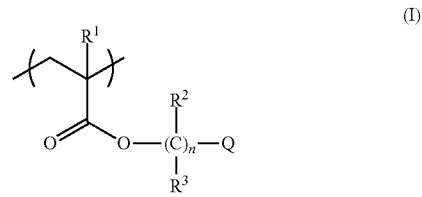

wherein:
   $R^1$ represents a hydrogen atom or a C1-C3 alkyl group,
   $R^2$ and $R^3$ each independently represents a hydrogen atom or a C1-C6 alkyl group,
   Q represents:
      an oxetanyl group,
      a tetrahydrofuranyl group,
      a tetrahydropyranyl group,
      a morpholinyl group, or
      a thiomorpholinyl group,
   wherein each group optionally has an alkyl group as a substituent; and n represents an integer of 1 to 6,
wherein the copolymer has an amine value of 80 mgKOH/g or more and 250 mgKOH/g or less.

2. The copolymer according to claim 1, wherein the repeating unit having a tertiary amino group is a repeating unit represented by formula (II):

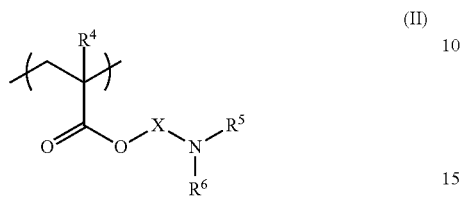

wherein:
$R^4$ represents a hydrogen atom or a C1-C3 alkyl group,
$R^5$ and $R^6$ each independently represents a C1-C6 alkyl group or a C6-C10 aryl C1-C6 alkyl group, and
X represents a C1-C10 alkylene group or a C1-C10 alkylene-O—C1-C10 alkylene group.

3. The copolymer according to claim 1, wherein the copolymer has a ratio (Mw/Mn) between a weight average molecular weight (Mw) and a number average molecular weight (Mn) of 1.01 to 2.00.

4. The copolymer according to claim 1, wherein the copolymer has a weight average molecular weight (Mw) of 2,000 to 50,000.

* * * * *